United States Patent [19]

George et al.

[11] 4,194,918
[45] Mar. 25, 1980

[54] ALKALI METAL SILICATE BINDER COMPOSITIONS

[75] Inventors: Raymond D. George; John Stevenson, both of Birmingham, England

[73] Assignee: Foseco International Limited, Birmingham, United Kingdom

[21] Appl. No.: 850,643

[22] Filed: Nov. 11, 1977

[30] Foreign Application Priority Data

Nov. 11, 1976 [GB] United Kingdom ............... 47651/76
Mar. 2, 1977 [GB] United Kingdom ................ 8852/77

[51] Int. Cl.$^2$ ................................................ C08L 3/02
[52] U.S. Cl. ...................... 106/80; 106/38.35; 106/38.5 R; 106/84; 106/162; 106/213; 106/214
[58] Field of Search ............. 106/38.3, 38.35, 208, 106/210, 80, 84, 38.5 R, 213, 162, 214; 164/43

[56] References Cited

U.S. PATENT DOCUMENTS

| | | | |
|---|---|---|---|
| 2,772,996 | 12/1956 | Sams | 106/80 |
| 4,070,196 | 1/1978 | Kraak et al. | 106/38.35 |

*Primary Examiner*—Lorenzo B. Hayes
*Attorney, Agent, or Firm*—Cushman, Darby & Cushman

[57] ABSTRACT

The invention relates to alkali metal silicate binder compositions, particularly for use in the production of foundry moulds and cores.

The binders of the invention are in aqueous solution and are obtained by mixing:
  (i) an alkali metal silicate,
  (ii) a substantially water soluble carbohydrate selected from glycans; glycan oligosaccharides; glycanitols; glycanitol derivatives of oligosaccharides; and monosaccharides and disaccharides and derivatives thereof, and
  (iii) an oxyanion of boron, tin, germanium, tellurium or arsenic, which can form with the carbohydrate a water soluble complex.

The binders of the invention give better breakdown properties and improved surface finish of metal castings produced using moulds and cores formed using the binders.

13 Claims, No Drawings

ALKALI METAL SILICATE BINDER COMPOSITIONS

This invention relates to alkali metal silicate binder compositions, particularly for use in the production of foundry moulds and cores.

It is common practice to use alkali metal silicate aqueous solutions, particularly sodium silicate solutions as binders for sand for the production of foundry moulds and cores. These solutions usually contain 40–50% by weight of a sodium silicate having a $SiO_2:Na_2O$ ratio of from 2.0:1 to 3.0:1. In one process the sodium silicate solution is mixed with sand, and the resultant mixture is formed into a mould or core. Carbon dioxide gas is then blown through the mould or core, and due to chemical reaction between the sodium silicate and the carbon dioxide a bonded mould or core results. In another process a so-called hardener, which may be for example, a mixture of diacetin and triacetin, is mixed with sodium silicate and sand, and the mixture is formed into a mould or core, which on standing hardens due to chemical reaction between the hardener and the sodium silicate.

A disadvantage of both processes is that after casting the moulds and cores are difficult to break down and remove from the solidified cast metal. This can be particularly disadvantageous in the case of cores of complex shape, or when the moulds and cores are used for the production of castings in metals which are cast at high temperatures, e.g. steel castings. Accordingly numerous proposals have been made in the past to add materials, so-called breakdown agents, to the mixture of sand and sodium silicate, which will aid the breakdown or disintegration ability of the sand mould or core after casting.

Among the breakdown agents used is a variety of carbohydrates and carbohydrate containing materials such as cellulose derivatives, starches, and sugars, e.g. sucrose and dextrose.

It is known to use in the manufacture of paper goods adhesive compositions containing an alkali metal silicate and borated dextrin (see for example U.S. Pat. No. 3,433,691). The borated dextrin is produced by adding an alkali metal borate to an aqueous dispersion of dextrin, which is a colloidal mixture formed by the hydrolysis of starch. Such compositions have a very low level of solubility in water and the compositions are difficult to handle since the dextrin floats out from the remainder of the composition. Floating out of the dextrin can be prevented by the incorporation of a swelling clay but the resulting composition is extremely viscous (see for example U.S. Pat. No. 3,767,440). Such a composition would not be suitable for use as a foundry sand binder.

It is further known from British Pat. No. 1,309,606 to use as a foundry binder an alkali metal silicate solution and an adjuvant comprising a homogeneous liquid polymeric condensation product formed by heating together a reducing sugar, urea and formaldehyde and using, for example, borax as a pH adjuster. Borax may also be added to a foundry sand containing the aqueous alkali metal silicate and the adjuvant as a hardener for the alkali metal silicate. The recommended addition is 3–12% by weight of alkali metal silicate and adjuvant. Such an addition is too high to effectively dissolve the borax in the alkali metal silicate solution, and when used in lower concentrations as a pH adjuster borax only serves a useful purpose when added to the components of the adjuvant. Furthermore when incorporated in the adjuvant the carbohydrate does not retain its identity as a carbohydrate.

It has now been found that if certain carbohydrates are complexed with certain oxyanion salts, especially borates, the formed complexes can be used advantageously in association with alkali metal silicate foundry sand binders.

According to the present invention there is provided a binder composition in aqueous solution obtained by mixing:
(i) an alkali metal silicate
(ii) a substantially water soluble carbohydrate selected from glycans; glycan oligosaccharides; glycanitols; glycanitol derivatives of oligosaccharides; and monosaccharides and disaccharides and derivatives thereof, and
(iii) an oxyanion of boron, tin, germanium, tellurium, or arsenic, which can form with the carbohydrate a water soluble complex.

According to a further feature of the invention there is provided a method of making an article of bonded particulate material, such as a foundry mould or core, which comprises forming to the desired shape a mixture comprising particulate material and a binder composition in aqueous solution obtained by mixing:
(i) an alkali metal silicate
(ii) a substantially water soluble carbohydrate selected from glycans; glycan oligosaccharides; glycanitols; glycanitol derivatives of oligosaccharides and monosaccharides and disaccharides and derivatives thereof, and
(iii) an oxyanion of boron, tin, germanium, tellurium, or arsenic, which can form with the carbohydrate a water soluble complex.

The preferred alkali metal silicate is sodium silicate. The $SiO_2:Na_2O$ ratio of the sodium silicate may vary widely, e.g. from 2.0:1 to 3.5:1 but sodium silicates having a ratio of from 2.0:1 to about 2.5:1 are preferred.

Mixtures of two or more carbohydrates and/or two or more oxyanions may be used.

Glycans are polymeric derivatives of monosaccharides with or without reducing sugar terminal groups. The monosaccharide constituent may be an aldose or a ketose. Examples of glycans are glucans (polymers of glucose), xylans (polymers of xylose) and gluco-xylans (copolymers of glucose and xylose).

In general high molecular weight glycans, such as starch, amylose and amylopectin, are unsuitable for use in binder compositions according to the invention since they are not soluble in water. Suitable glycans are available as components of starch hydrolysates or glucose syrups.

Glycan oligosaccharides are derivatives of glycans produced by acid, enzymic or other procedures which cause rupture of the glycosidic linkage in the parent glycan. Suitable glycan oligosaccharides are available as components of starch hydrolysates or glucose syrups.

Glycanitols are products obtained by the reduction of glycans. The monosaccharide constituent of the glycan may be an aldose or a ketose. During production of a glycanitol the stereo-chemical configuration of the substituted aldose or ketose end group may be retained or there may be conversion in the derived polyhydric alcohol derivative. For example, the reduction of a substituted reducing end group, such as a substituted glucose end group in a starch dextrin, may occur with retention of configuration to yield a substituted glucitol (such as sorbitol) derivative or with some conversion to a substituted mannitol derivative where the configuration of carbon two is altered. Suitable glycanitols are available as components of hydrogenated starch hydrolysates.

Glycanitol derivatives of oligosaccharides are products obtained by the reduction of glycan oligosaccharides and are available for example as components of hydrogenated starch hydrolysates. Other examples of glycanitol derivatives of oligosaccharides are derivatives of disaccharides such as maltitol (derived from maltose) and lactitol (derived from lactose).

Examples of suitable monosaccharides include glucose, mannose and fructose. Examples of suitable disaccharides include sucrose, maltose and lactose.

Examples of suitable monosaccharide derivatives include hexitols which are produced by the reduction of their corresponding hexoses, for example sorbitol which is produced by the reduction of glucose or gulose and mannitol which is produced by the reduction of mannose, and pentitols which are produced by the reduction of their corresponding pentoses, for example xylitol which is produced by the reduction of xylose.

Commercially available carbohydrate-containing materials which may contain one or more carbohydrates may be used. Examples of such materials include molasses from sucrose refining, whey from milk processing, invert sugar or partially inverted sugar which is a mixture of sucrose, fructose and glucose, and the glucose syrups referred to above.

Derivatives of carbohydrates in which the structure is modified other than at the reducing terminal group by processes such as etherification, esterification or oxidation may also be used. Examples of such derivatives are oxidised starch syrups, esters of starch and carboxyalkyl ethers of starch.

The preferred carbohydrates are "stabilised" carbohydrates whose reducing power has been removed in order to render the carbohydrates essentially stable in alkaline media.

Stabilised carbohydrates may be produced by hydrogenation or by other processes which remove reducing power such as etherification, esterification or oxidation or by reaction with urea or urea derivatives.

Examples of stabilised carbohydrates are glycanitols, glycanitol derivatives of oligosaccharides, hexitols and pentitols.

The preferred stabilised carbohydrates are the stabilised starch hydrolysates described in U.S. patent application Ser. No. 719,151. These stabilised starch hydrolysates may be prepared from starch hydrolysates having a dextrose equivalent of between 5 and 100, preferably between 5 and 75, and more preferably between 10 and 40. Dextrose equivalent is defined as the reducing power, i.e., the reducing sugar content of a starch hydrolysate expressed as D-glucose on a dry basis. The starch hydrolysate may be stabilised by selective oxidation, by reaction with urea or urea derivatives, or by hydrogenation. The preferred method is by catalytic hydrogenation with hydrogen. After stabilisation the dextrose equivalent of the starch hydrolysate is reduced below 5, preferably below 2 and more preferably below 0.5.

The oxyanion may be added to the composition in the form of an oxyanion salt or an oxyanion salt may be formed in situ as a result of interaction between an acid containing the oxyanion or an oxide, and added alkali or alkali contained in the alkali metal silicate.

Examples of suitable oxyanion salts include alkali metal oxyanion salts such as sodium metaborate, sodium tetraborate, sodium pentaborate, sodium germanate, sodium stannate, sodium tellurite and sodium arsenite. Of the oxyanion salts of tin, tellurium, and arsenic, stannates, tellurites and arsenites respectively are preferred. The most preferred oxyanion salts are alkali metal borates since they are readily and economically available.

Examples of oxyanion salts formed in situ are an alkali metal borate formed by interaction between boric acid or boric oxide and an alkali for example the alkali in the alkali metal silicate, and an alkali metal germanate formed by reaction between germanium dioxide and an alkali.

It will be appreciated that for any given carbohydrate there may be one or more oxyanion salts which give the optimum results and that such salts should preferably be selected from the available oxyanion salts.

The binder composition may be added to the particulate material as separate additions of aqueous solutions of the alkali metal silicate, carbohydrate or oxyanion salt components or any two or all three of the components may be premixed. Premixing of the oxyanion salt with an aqueous solution of the carbohydrate or with the aqueous alkali metal silicate and separate addition of the third component, or premixing of all three components are preferred. However, the method adopted for adding the binder composition is to some extent dependent on the particular carbohydrate material used since some carbohydrate materials, e.g. carbohydrates containing reducing sugars react with alkali metal silicates and cannot therefore be premixed with the alkali metal silicate and stored. When the carbohydrate and the alkali metal silicate cannot be premixed for storage it may be convenient to dissolve part of the oxyanion salt in the alkali metal silicate and part in an aqueous solution of the carbohydrate.

The binder composition will usually contain 16–47% by weight of alkali metal silicate and 2–45% by weight of carbohydrate.

The minimum oxyanion content will be of the order of 0.1% by weight of the aqueous binder composition while the maximum oxyanion content will be determined by the solubility limit of a particular oxyanion salt in the aqueous binder composition, and can therefore vary quite widely. Oxyanion salt contents of up to 5% by weight of the aqueous binder are typical.

Preferably the amount of oxyanion present is sufficient to complex substantially all of the carbohydrate present.

The preferred binder compositions contain 26–45% by weight of alkali metal silicate, 3 to 27% by weight of carbohydrate and 0.5–2.0% by weight of oxyanion salt.

The actual composition for a particular combination of alkali metal silicate, carbohydrate and oxyanion will depend on a number of factors such as the nature of the carbohydrate, the degree of mutual solubility of the three components, the alkali metal oxide to silica ratio of the alkali metal silicate and the nature of the oxyanion.

While the binder composition has been described as having three essential components, it will be appreciated that other ingredients may be present, preferably in relatively minor amounts, for example colorants or additives known in the art for improving the surface finish of metal castings.

The binder composition of the invention may be used to bond a variety of particulate materials but is particularly useful for bonding particulate refractory materials such as silica, olivine, chromite and ziron sands in the manufacture of foundry moulds or cores. After production the mould or core may be hardened by injection of carbon dioxide gas or alternatively a chemical hardening agent for the alkali metal silicate, e.g., a mixture of acetate esters of glycerol, may be added to the sand binder composition mixture before the moulds or cores are formed.

The improved binder compositions of the invention offer a number of advantages when used in the production of foundry moulds or cores.

When moulds and cores are hardened by gassing with carbon dioxide the gassing time compared with normal practice may be reduced thus resulting in a saving of carbon dioxide and there is less tendency to "overgassing" compared with other silicate binders. Furthermore the moulds and cores have increased strength immediately after gassing and after storage in either dry or humid conditions, and although increased strength results, "breakdown" properties, i.e., the ability to break down and remove moulds and cores from solidified cast metal, are not impaired.

With both carbon dioxide gassed and chemically hardened silicate bonded sands it is possible to reduce the amount of sodium silicate used compared with normal practice. The breakdown properties of sodium silicate-bonded sands and the surface finish of metal castings produced using such sands are both affected by the soda content of the sodium silicate binder. Thus a reduction in the amount of sodium silicate used not only produces an economic advantage in that it results in a saving of sodium silicate but also gives better breakdown properties of the sand and improved surface finish of metal castings produced using the sand. Furthermore due to a lowering of the amount of residual soda in the sand after casting, the sand is more readily reclaimable for re-use.

The following examples will serve to illustrate the invention and demonstrate the use of representative carbohydrates and representative oxyanions.

EXAMPLE 1

Three binder compositions were prepared as follows:
(1) 20% by weight of hydrogenated starch hydrolysate syrup (a mixture of glycanitols, glycanitol derivatives of oligosaccharides, reduced monosaccharides and reduced disaccharides) derived from potato starch and having a dextrose equivalent of about 30 before hydrogenation and 0.005 after hydrogenation and a starch hydrolysate content of 65% by weight was blended with 80% by weight of an aqueous sodium silicate solution having a $SiO_2:Na_2O$ ratio of 2.4:1 and a sodium silicate content of 46% by weight.
(2) 10 parts by weight of hydrated sodium metaborate were dissolved in 100 parts by weight of the starch hydrolysate group used to prepare binder (1). 20% by weight of the resulting solution was blended with 80% by weight of the sodium silicate solution used to prepare binder (1).
(3) 7.5 parts by weight of anhydrous sodium tetraborate were dissolved in 100 parts by weight of the starch hydrolysate syrup used to prepare binder (1). 20% by weight of the resulting solution was blended with 80% by weight of the sodium silicate solution used to prepare binder (1).

As a result of chemical interaction between the starch hydrolysate and the sodium metaborate and sodium tetraborate respectively producing an increase in viscosity of the starch hydrolysate syrup, binders (2) and (3) were higher in viscosity than binder (1). To eliminate possible effects from viscosity variations in any test results the viscosity of the binders was adjusted with water to a viscosity of 1200 cp measured on a Brookfield LVF Viscometer.

3.5 parts by weight of each of the binder compositions were mixed with 100 parts by weight silica sand (AFS Fineness No. 44). The sand-binder mixtures were then used to prepare standard AFS 50 mm high×50 mm diameter cylindrical cores. Cores were gassed for various times with carbon dioxide gas at 25° C., 0.35 $kg/cm^2$ line pressure and 5.5 liters/minute flow rate.

The compression strengths of the cores produced were then measured:
(a) on specimens immediately (i.e., within 10 seconds) after gassing
(b) on specimens stored for 24 hours in a relatively dry laboratory atmosphere
(c) on specimens stored for 24 hours under humid conditions (25°–27° C. relative humidity 90%)

The results are tabulated below:

|  |  | Compression Strength (p.s.i.) | | | | | |
| --- | --- | --- | --- | --- | --- | --- | --- |
|  | gassing time (secs) | 5 | 10 | 20 | 30 | 60 | 120 |
| Binder 1 | as gassed | 27 | 45 | 90 | 113 | 145 | 156 |
|  | dry storage | 317 | 230 | 214 | 140 | 84 | 72 |
|  | humid storage | 164 | 139 | 117 | 130 | 108 | 115 |
| Binder 2 | as gassed | 28 | 51 | 102 | 142 | 191 | 198 |
|  | dry storage | 460 | 424 | 288 | 221 | 183 | 141 |
|  | humid storage | 216 | 207 | 180 | 140 | 120 | 111 |
| Binder 3 | as gassed | 48 | 82 | 138 | 183 | 208 | 212 |
|  | dry storage | 513 | 442 | 331 | 253 | 192 | 174 |
|  | humid storage | 247 | 247 | 196 | 139 | 122 | 121 |

These results show that gassing time affects not only the as gassed strength but also strength after storage for 24 hours. To achieve an as gassed strength of 100 p.s.i. using binder (1) requires a gassing time of approximately 25 seconds and a strength of approximately 170 p.s.i. would result after 24 hours dry storage.

In comparison binder (2) requires only approximately 20 seconds and results in a strength of approximately 290 p.s.i. after 24 hours dry storage, while binder (3) requires only approximately 15 seconds and results in a strength of approximately 375 p.s.i. after 24 hours dry storage.

Thus the use of binders (2) and (3) results in a saving of carbon dioxide gas, and also gives improved strengths after both dry and humid storage.

EXAMPLE 2

Three binder compositions were prepared as follows:
(4) 20% by weight of a 70% by weight aqueous solution of sorbitol was blended with 80% by weight of an aqueous sodium silicate having a $SiO_2:Na_2O$ ratio of 2.4:1 and a sodium silicate content of 46% by weight.
(5) 10 parts by weight of hydrated sodium metaborate were dissolved in 100 parts by weight of the sorbitol solution used to prepare binder (4). 20% by weight of the resulting solution was blended with 80% by weight of the sodium silicate solution used to prepare binder (4).
(6) 7.5 parts by weight of anhydrous sodium tetraborate were dissolved in 100 parts by weight of the sorbitol solution used to prepare binder (4). 20% by weight of the resulting solution was blended with 80% by weight of the sodium silicate solution used to prepare binder (4).

Binder (4) had a viscosity of 660 cp, binder (5) a viscosity of 710 cp and binder (6) a viscosity of 1060 cp.

3.5 parts by weight of each of the binder compositions were mixed with 100 parts by weight of silica sand (AFS Fineness No. 44). The sand-binder mixtures were then used to prepare standard AFS 50 mm high×50 mm diameter cylindrical cores. Cores were gassed for various times with carbon dioxide at 24.5°–25.0° C., 0.35 kg/cm² line pressure and 5.5 liters/minute flow rate.

The compression strengths of the cores produced were then measured:

(a) on specimens immediately (i.e., within 10 seconds) after gassing.

(b) on specimens stored for 24 hours in a relatively dry laboratory atmosphere (17.0°–20.0° C., relative humidity 50–55%)

(c) on specimens stored for 24 hours under humid conditions (24.5°–25.0° C., relative humidity 90–95%)

The results are tabulated below:

|  | gassing time (secs) | Compression strength (p.s.i.) | | | | | |
|---|---|---|---|---|---|---|---|
|  |  | 5 | 10 | 20 | 30 | 60 | 120 |
| Binder 4 | as gassed | — | — | 58 | 98 | 158 | 186 |
|  | dry storage | 447 | 325 | 262 | 205 | 125 | 103 |
|  | humid storage | 158 | 158 | 175 | 170 | 162 | 187 |
| Binder 5 | as gassed | — | 32 | 72 | 105 | 159 | 171 |
|  | dry storage | 442 | 342 | 253 | 205 | 147 | 105 |
|  | humid storage | 172 | 175 | 170 | 160 | 140 | 172 |
| Binder 6 | as gassed | — | 49 | 88 | 124 | 156 | 165 |
|  | dry storage | 482 | 420 | 280 | 240 | 115 | 105 |
|  | humid storage | 195 | 200 | 180 | 185 | 185 | 212 |

Binders (4) (5) and (6) gave similar results in terms of the compression strength of cores stored under dry or humid storage conditions but both (5) and (6) were superior to (4) in respect of gassing speed. To achieve an as gassed strength of 100 p.s.i. using binder (4) required 31 seconds whereas using binder (5) required 28 seconds and using binder (6) required 23 seconds.

EXAMPLE 3

Binder composition (7) was prepared as follows:

10 parts by weight of sodium stannate were dispersed in 9 parts by weight of water and the resulting aqueous dispersion was blended with 100 part by weight of the starch hydrolysate syrup used to prepare binder (1) in Example 1. The viscosity of the starch hydrolysate-sodium syrup mixture was 2000 cp. 20% by weight of the mixture was then blended with 80% by weight of the sodium silicate solution used to prepare binder (1) in Example 1. Water was added to the resulting mixture to reduce the viscosity to 1470 cp.

Binder composition (7) was tested in comparison with binder composition (1) using the procedure described in Example 1. The gassing temperature was 25.0°–25.5° C., the dry storage conditions 22°–23° C. and relative humidity 52–56%, and the humid storage conditions 23°–24° C. and relative humidity 90–95%.

Under the test conditions binder (1) required a gassing time of 21 seconds to achieve an as gassed strength of 100 p.s.i. while binder (7) required only 17.5 seconds. Maximum attainable strengths and strengths on dry or humid storage were similar for both binder compositions even though binder composition (7) contained less actual binder than binder composition (1). Due to its lower actual binder content binder composition (7) would introduce less soda into a foundry sand compared with binder composition (1) if the two binder compositions were used as described in the example.

EXAMPLE 4

Two binder compositions were prepared as follows:

(8) 20% by weight of a hydrogenated starch hydrolysate syrup was blended with 80% by weight of an aqueous sodium silicate solution having a $SiO_2$:$Na_2O$ ratio of 2.2:1 and a viscosity of 770 cp measured on a Brookfield RVF Viscometer.

The hydrogenated starch hydrolysate syrup was derived from maize starch, had a dextrose equivalent of about 33 before hydrogenation and less than 0.2 after hydrogenation.

The solids content of the syrup was reduced from 75% by weight of 68% by weight with water before the syrup was blended with the sodium silicate solution.

(9) 7.5 parts by weight of anhydrous sodium tetraborate were dissolved in 100 parts by weight of the starch hydrolysate syrup used to prepare binder (8). The solids content of the syrup had previously been reduced from 75% by weight to 68% by weight with water. 20% by weight of the resulting solution was blended with 80% by weight of the sodium silicate solution used to prepare binder (8).

The viscosity of each of the binders was adjusted to 770 cp measured on a Brookfield LVF Viscometer by the addition of water.

Binder composition (9) was tested in comparison with binder composition (8) using the procedure described in Example 1. The gassing temperature was 20.5°–21.5° C., the dry storage conditions 19°–22° C. and relative humidity 47–51%, and the humid storage conditions 21° C. and relative humidity 90–95%.

The results are tabulated below:

|  | gassing time (secs) | Compression strength (p.s.i.) | | | | | |
|---|---|---|---|---|---|---|---|
|  |  | 5 | 10 | 20 | 30 | 60 | 120 |
| Binder (8) | as gassed | — | 30 | 58 | 78 | 109 | 136 |
|  | dry storage | 650 | 371 | 292 | 203 | 118 | 96 |
|  | humid storage | 139 | 153 | 121 | 96 | 85 | 76 |
| Binder (9) | as gassed | — | 34 | 79 | 118 | 165 | 194 |
|  | dry storage | 789 | 631 | 459 | 359 | 217 | 139 |
|  | humid storage | 211 | 182 | 182 | 149 | 125 | 132 |

Binder (9) was superior to binder (8) in terms of gassing speed, and attainable strength, and cores containing binder (9) also had better storage properties under dry or humid storage conditions. To achieve an as gassed strength of 100 p.s.i. using binder (8) required 47 seconds while using binder (9) only 24 seconds were required. After dry storage for 24 hours cores gassed to 100 p.s.i. and containing binder (8) had a compression strength of 140 p.s.i. while similar cores containing binder (9) had a compression strength of 420 p.s.i.

EXAMPLE 5

Two binder compositions were prepared as follows:

(10) 20% by weight of hydrogenated starch hydrolysate syrup derived from the maize starch and having a dextrose equivalent of less than 0.1 and a starch hydrolysate content of approximately 65% by weight was blended with 80% by weight of an aqueous sodium silicate solution having a $SiO_2$:

Na$_2$O of 2.2:1 and a viscosity of 770 cp. at 20.0° C. measured on a Brookfield RVF Viscometer.

(11) 7.5 parts by weight of anhydrous sodium tetraborate were dissolved in 100 parts by weight of the starch hydrolysate syrup used to prepare binder (10). 20% by weight of the resulting solution was blended with 80% by weight of the sodium silicate solution used to prepare binder (10).

The starch hydrolysate used to prepare binders (10) and (11) had a dextrose equivalent of approximately 55 before hydrogenation.

The viscosity of each binder was adjusted by dilution with water to 770 cp.

Binder compositions (10) and (11) were compared using the procedure described in Example 1.

The gassing temperature was 24°-25° C., the dry storage conditions 16°-20° C. and relative humidity 48-52%, and the humid storage conditions 26° C. and 90-95% relative humidity.

The results are tabulated below:

|  | gassing time (secs) | Compression strength (p.s.i.) | | | | | |
|---|---|---|---|---|---|---|---|
|  |  | 5 | 10 | 20 | 30 | 60 | 120 |
| Binder (10) | as gassed | — | — | 45 | 69 | 117 | 150 |
|  | dry storage | 504 | 386 | 228 | 164 | 122 | 70 |
|  | humid storage | 143 | 128 | 128 | 108 | 122 | 114 |
| Binder (11) | as gassed | — | — | 45 | 69 | 114 | 150 |
|  | dry storage | 660 | 526 | 450 | 342 | 284 | 220 |
|  | humid storage | 192 | 183 | 143 | 143 | 147 | 147 |

Binders (10) and (11) gave similar results in terms of gassing speed and attainable as-gassed strength. Using each binder, a gassing time of approximately 45 seconds was required to obtain an initial strength of 100 p.s.i. However, binder (11) gives much superior strengths on storage. Using binder (11) an initial strength on gassing of 100 p.s.i. increases to 290 p.s.i. on dry storage and 145 p.s.i. on humid storage, whereas with binder (10) an as-gassed strength of 100 p.s.i. increases to only 130 p.s.i. on dry storage and to 116 p.s.i. on humid storage.

EXAMPLE 6

Two binder compositions were prepared as follows:

Binders (12) and (13) were prepared according to the methods described respectively for binders (10) and (11) using a different hydrogenated starch hydrolysate derived from maize starch and having a dextrose equivalent of less than 0.15 and a starch hydrolysate content of 63% by weight. The hydrogenated starch hydrolysate used to prepare binders (12) and (13) contained predominantly hydrogenated maltose.

The viscosity of binders (12) and (13) was adjusted by dilution with water to 760 cp.

3.5 parts by weight of each of the binder compositions (12) and (13) were mixed with 100 parts by weight of silica sand (AFS Fineness No. 44). The sand-binder mixtures were then used to prepare standard AFS 50 mm × 50 mm diameter cylindrical cores. Cores were gassed for various times with carbon dioxide at 21°-22° C., 0.35 kg/cm$^2$ line pressure and 5.5 liters/minute flow rate.

The compression strengths of the cores produced were then measured on specimens immediately (i.e., within 10 seconds) after gassing.

The results are tabulated below:

|  | Gassing time (secs) | Compression strength (p.s.i.) | | | | | |
|---|---|---|---|---|---|---|---|
|  |  | 5 | 10 | 20 | 30 | 60 | 120 |
| Binder (12) | as gassed | — | — | 78 | 120 | 168 | 171 |
| Binder (13) | as gassed | — | 48 | 96 | 138 | 168 | 180 |

Although the attainable strengths are similar, the rate of gassing is superior for binder (13). Thus, to achieve an as-gassed strength of 100 p.s.i. using binder (12) required 25 seconds gassing whereas binder (13) required only 21 seconds, representing a saving of about 16% on gas consumption.

EXAMPLE 7

Binder (14) was prepared as follows:

7.5 parts by weight of anhydrous sodium tetraborate were dissolved in 100 parts by weight of a solution of maltitol. 20 parts by weight of this mixture were blended with 80 parts by weight of an aqueous solution of sodium silicate having a SiO$_2$:Na$_2$O ratio of 2.2:1 and a viscosity of 440 cp. at 20.0° C., measured on a Brookfield RVF Viscometer. The viscosity of the resultant binder was adjusted with water to 750 cp.

Binder (14) was compared to binder (9) by the procedure described in Example 1. The compression strengths of the specimens produced were compared:

(a) Immediately (i.e., within 10 seconds) after gassing.

(b) After 24 hours storage in a relatively dry laboratory atmosphere.

The gas temperature was 21.0° C. and the storage conditions 18°-20° C. and relative humidity 48-51%.

The results are tabulated below:

|  | gassing time (secs) | Compression strengths (p.s.i.) | | | | | |
|---|---|---|---|---|---|---|---|
|  |  | 5 | 10 | 20 | 30 | 60 | 120 |
| Binder (14) | as-gassed | 108 | 156 | 210 | 234 | 234 | 243 |
|  | dry storage | 564 | 464 | 376 | 314 | 280 | 256 |
| Binder (9) | as-gassed | 75 | 135 | 222 | 240 | 276 | 281 |
|  | dry storage | 750 | 636 | 513 | 450 | 306 | 284 |

It can be seen that binder (14) gives a similar performance compared to binder (9).

EXAMPLE 8

The following binder compositions were prepared:

(15) 9.9 parts by weight of boric acid were dissolved in 100 parts by weight of an hydrogenated starch hydrolysate syrup derived from maize starch and having a dextrose equivalent of less than 0.2 and a starch hydrolysate content of approximately 63% by weight. 20% by weight of the resulting solution was blended with 80% by weight of an aqueous solution of sodium silicate having an SiO$_2$:Na$_2$O ratio of 2.2:1 and a viscosity of 710 cp. at 20.0° C. measured on a Brookfield RVF Viscometer.

(16) 9.9 parts by weight of boric acid and 3.3 parts by weight of sodium hydroxide were dissolved in 100 parts by weight of the hydrogenated starch hydrolysate syrup used to prepare binder (15). 20% by weight of the resulting solution were blended with 80% by weight of the sodium silicate solution used to prepare binder (15).

(17) 5.5 parts by weight of boric oxide were dissolved in 100 parts by weight of the hydrogenated starch hydrolysate syrup used to prepare binder (15). 20% by weight of the resulting solution were blended with 80% by weight of the sodium silicate solution used to prepare binder (15).

(18) 5.5 parts by weight of boric oxide and 3.14 parts by weight of sodium hydroxide were dissolved in 100 parts by weight of the hydrogenated starch hydrolysate syrup used to prepare binder (15). 20% by weight of the resulting solution were blended with 80% by weight of the sodium silicate solution used to prepare binder (15).

The viscosity of binders (15) to (18) was adjusted to 750 cp. as necessary.

The hydrogenated starch hydrolysate used to prepare binders (15)–(18) had a dextrose equivalent before hydrogenation of approximately 33.

Binders (15)–(18) were compared to binders (8) and (9) using the procedure described in Example 1. The compression strengths of the cores produced were determined immediately (i.e. within 10 seconds) after gassing. The gas temperature was 21° C.

The results are tabulated below:

|  | gassing time (secs) | Compression strength (p.s.i.) | | | | | |
|---|---|---|---|---|---|---|---|
|  |  | 5 | 10 | 20 | 30 | 60 | 120 |
| Binder (8) | as-gassed | — | 36 | 72 | 105 | 141 | 138 |
| Binder (9) | as-gassed | 30 | 60 | 123 | 168 | 222 | 232 |
| Binder (15) | as-gassed | 33 | 60 | 123 | 177 | 237 | 243 |
| Binder (16) | as-gassed | 30 | 54 | 117 | 162 | 225 | 252 |
| Binder (17) | as-gassed | 33 | 60 | 123 | 165 | 222 | 240 |
| Binder (18) | as-gassed | 33 | 58 | 123 | 183 | 234 | 234 |

The rate of gassing and attainable strengths for binders (9) and (15)–(18) are similar and all much superior to binder (8).

In addition, the manner in which the borate compound is introduced into these binders does not alter the improved performance of these binders. Binders (9) and (15)–(18) had approximately the same concentration of borate compounds expressed as parts by weight of boron.

EXAMPLE 9

The following composition was prepared:

(19) 7.5 parts by weight of anhydrous sodium tetraborate were dissolved in 100 parts by weight of the hydrogenated starch hydrolysate syrup used to prepare binder (8). The viscosity of the resulting solution was reduced from 4500 cp. to 1100 cp.

0.7 parts by weight of composition (19) were mixed with 100 parts by weight of silica sand (AFS Fineness No. 44). 2.8 parts by weight of an aqueous sodium silicate solution of SiO₂:Na₂O ratio of 2.2:1 and a viscosity of 440 cp. were then mixed with the same sand.

3.5 parts by weight of binder (9) were mixed with 100 parts by weight of silica sand.

These two binder-sand mixtures were compared using the procedure described in Example 1. The compression strengths of the specimens produced were measured immediately (i.e., within 10 seconds) after gassing. The gas temperature was 21° C.

The results are tabulated below:

|  | gassing time (secs) | Compression strengths (p.s.i.) | | | | | |
|---|---|---|---|---|---|---|---|
|  |  | 5 | 10 | 20 | 30 | 60 | 120 |
| Binder (9) | as gassed | 33 | 66 | 111 | 147 | 192 | 225 |
| Composition (19) + Sodium Silicate | as gassed | 33 | 57 | 111 | 138 | 201 | 222 |

Thus, the improved performance given by binder (9) is maintained if the binder is added to the sand in two parts as with the combination of composition (19) and sodium silicate.

EXAMPLE 10

The following binder composition was prepared:

(20) 3.14 parts by weight of germanium dioxide and 2.4 parts by weight of sodium hydroxide were dissolved in 100 parts by weight of the hydrogenated starch hydrolysate used to prepare binder (8). 20% by weight of the resulting solution was blended with 80% by weight of the sodium silicate solution used to prepare binder (8). The viscosity of the resulting binder was adjusted to 700 cp by the addition of water.

Binder composition (20) was tested in comparison to binder composition (8) using the procedure described in Example 1. The gassing temperature was 25.0°–25.5° C., the dry storage conditions 19°–21° C. and relative humidity 48–51%, and the humid storage conditions 25° C. and relative humidity 90–95%.

The results are tabulated below:

|  | gassing time (secs) | Compression strengths (p.s.i.) | | | | | |
|---|---|---|---|---|---|---|---|
|  |  | 5 | 10 | 20 | 30 | 60 | 120 |
| Binder (8) | as gassed | — | 30 | 51 | 105 | 132 | 158 |
|  | dry storage | 715 | 642 | 378 | 270 | 128 | 128 |
|  | humid storage | 200 | 172 | 143 | 122 | 100 | 108 |
| Binder (20) | as gassed | — | 36 | 75 | 117 | 168 | 195 |
|  | dry storage | 820 | 757 | 575 | 400 | 300 | 200 |
|  | humid storage | 228 | 212 | 212 | 172 | 135 | 114 |

Binder composition (20) was superior to binder composition (8) in terms of gassing speed and attainable strength and cores containing binder (20) also had better storage properties under dry and humid storage conditions. To achieve an as-gassed strength of 100 p.s.i. using binder (8) required 29 seconds, while using binder (20) required only 25 seconds. After storage for 24 hours, cores gassed to 100 p.s.i. and containing binder (8) had a compression strength of 278 p.s.i. when stored under dry conditions and 124 p.s.i. when stored under humid conditions, while similar cores prepared using binder (20) had compression strengths of 485 p.s.i. after dry storage and 188 p.s.i. after humid storage.

EXAMPLE 11

The following binder composition was prepared:

(21) 7.5 parts by weight of sodium arsenite were dissolved in 100 parts by weight of the hydrogenated starch hydrolysate syrup used to prepare binder (8). 20 parts by weight of the resulting solution were blended with 80 parts by weight of the sodium silicate solution used to prepare binder (8).

The viscosity of the resulting binder was adjusted to 750 cp by the addition of water.

Binder composition (21) was compared to binder (8) by the procedure described in Example 1. The gassing temperature was 21.5-22.0° C.

The results are tabulated below:

|  | gassing time (secs) | Compression strengths (p.s.i.) | | | | | |
|---|---|---|---|---|---|---|---|
|  |  | 5 | 10 | 20 | 30 | 60 | 120 |
| Binder (8) | as-gassed | — | 45 | 81 | 105 | 126 | 144 |
| Binder (21) | as-gassed | 39 | 84 | 118 | 147 | 153 | 156 |

Clearly binder (21) exhibits a significantly faster rate of strength development. Thus binder (21) achieves a strength of 100 p.s.i. after approximately 15 seconds, whereas binder (8) requires 28 seconds gassing to achieve the same strength.

EXAMPLE 12

The following compositions were prepared:
(23) An aqueous solution of glucose containing 65% by weight of glucose.
(24) 7.5 parts by weight of anhydrous sodium tetraborate were dissolved in 100 parts by weight of composition (23).
(25) 10 parts by weight of anhydrous sodium tetraborate were dissolved in 100 parts by weight of composition (23).
(26) 10 parts by weight of hydrated sodium metaborate were dissolved in 100 parts by weight of composition (23).

1 part by weight of each of compositions (23)-(26) were mixed with 100 parts by weight of silica sand (AFS Fineness No. 44), followed by 2.5 parts of an aqueous solution of sodium silicate having an $SiO_2$:$Na_2O$ ratio of 2.4:1 and a viscosity of 2000 cp. at 20.0° C. measured with a Brookfield RVF Viscometer. The sand-binder mixtures were then used to prepare standard AFS 50 mm high×50 mm diameter cylindrical cores. Cores were gassed for various times with carbon dioxide gas at 25° C., 0.35 Kg./cm² line pressure and 5.5 liters/minute flow rate.

The compression strengths of the cores produced were then measured:
(a) on specimens immediately (i.e., within 10 seconds) after gassing.
(b) on specimens stored for 24 hours in a relatively dry laboratory atmosphere.
(c) on specimens stored for 24 hours under humid conditions (25°-27° C., relative humidity 90%).

The results are tabulated below:

|  | gassing time (secs) | Compression strengths (p.s.i.) | | | | | |
|---|---|---|---|---|---|---|---|
|  |  | 5 | 10 | 20 | 30 | 60 | 120 |
| Composition (23) + Sodium Silicate | as-gassed | — | 63 | 102 | 138 | 180 | 177 |
|  | dry storage | 150 | 104 | 56 | 53 | 45 | 29 |
|  | humid storage | 96 | 96 | 100 | 104 | 108 | 122 |
| Composition (24) + Sodium Silicate | as-gassed | 39 | 69 | 132 | 150 | 177 | 177 |
|  | dry storage | 280 | 125 | 56 | 45 | 36 | 36 |
|  | humid storage | 114 | 122 | 156 | 130 | 156 | 143 |
| Composition (25) + Sodium Silicate | as-gassed | 51 | 75 | 132 | 150 | 174 | 171 |
|  | dry storage | 320 | 253 | 200 | 125 | 40 | 40 |
|  | humid storage | 125 | 135 | 125 | 130 | 122 | 128 |
| Composition (26) + Sodium Silicate | as-gassed | 48 | 75 | 135 | 156 | 189 | 207 |
|  | dry storage | 280 | 187 | 100 | 74 | 64 | 43 |
|  | humid storage | 179 | 164 | 143 | 143 | 156 | 164 |

These results show that compositions (24)-(26) improve the rate of strength development on gassing. Composition (26) also increases the attainable strength.

The storage properties of the cores are also improved using compositions (24)-(26) for the major part of the range of gassing times. In this respect compositions (25) and (26) are significantly better than composition (24). Thus, to obtain an as-gassed strength of 100 p.s.i. requires times of 19, 15, 13.5 and 13.5 seconds for compositions (23)-(26) respectively. These gassing times result in dry storage strengths of 58, 80, 240 and 150 p.s.i. respectively, and humid storage strengths of approximately 99, 125, 128 and 155 p.s.i. respectively for binders (23)-(26).

EXAMPLE 13

The following compositions were prepared:
(27) A starch hydrolysate syrup containing a mixture of glycans, glycan oligosaccharides, monosaccharides and disaccharides and having a dextrose equivalent of 53-55 and a starch hydrolysate content of approximately 60% by weight.
(28) 7.5 parts of anhydrous sodium tetraborate were dissolved in 100 parts by weight of the starch hydrolysate in composition (27).

The viscosity of composition (27) was 700 cp. at 20.0° C., and the viscosity of composition (28) was reduced to this value by dilution with water.

Compositions (27) and (28) were compared using the method described in Example 12 and using the sodium silicate solution described in Example 12.

The compression strengths of the cores produced were measured:
(a) Immediately after gassing.
(b) After 24 hours storage in a relatively dry laboratory atmosphere.

The results are tabulated below:

|  | gassing time (secs) | Compression strengths (p.s.i.) | | | | | |
|---|---|---|---|---|---|---|---|
|  |  | 5 | 10 | 20 | 30 | 60 | 120 |
| Composition (27) + Sodium Silicate | as-gassed | — | — | 48 | 60 | 99 | 147 |
|  | dry storage | 534 | 420 | 284 | 212 | 86 | 86 |
| Composition (28) + Sodium Silicate | as-gassed | — | 33 | 60 | 86 | 111 | 150 |
|  | dry storage | 607 | 564 | 420 | 336 | 303 | 280 |

Composition (28) gives a superior rate of strength development on gassing to (27) although the attainable strengths are similar. In addition the storage properties of (28) are significantly higher than (27). Thus composition (28) requires a gassing time of 41 seconds to attain a strength of 100 p.s.i. and results in a strength of 310 p.s.i. after storage. Composition (27) requires 61 seconds gassing and decreases in strength on storage to only 86 p.s.i.

EXAMPLE 14

The following binder compositions were prepared:
(29) 20% by weight of an aqueous solution of sucrose containing 65% by weight of sucrose were blended with 80% by weight of an aqueous sodium silicate solution having an $SiO_2:Na_2O$ ratio of 2.4:1 and a viscosity of 2000 cp. at 20.0° C.
(30) 7 parts by weight of anhydrous sodium tetraborate were dissolved in 100 parts of the sucrose solution used to prepare binder (29). 20% by weight of the resulting solution were blended with 80% by weight of the sodium silicate solution used to prepare binder (29).

The viscosity of binders (29) and (30) were reduced to 900 cp. at 20.0° C. by dilution with water.

The binder systems were compared as follows:

3.5 parts by weight of each binder were mixed with 100 parts by weight of silica sand (AFS Fineness No. 44). The resulting sand-binder mixtures were used to prepare cores according to the procedure described in Example 12. The compression strengths of the specimens were determined immediately after gassing.

The results obtained are tabulated below:

|  | gassing time (secs) | Compression strengths (p.s.i.) | | | | | |
|---|---|---|---|---|---|---|---|
|  |  | 5 | 10 | 20 | 30 | 60 | 120 |
| Binder (29) | as-gassed | — | 30 | 81 | 118 | 174 | 210 |
| Binder (30) | as-gassed | — | 54 | 105 | 126 | 180 | 204 |

These results show that, although attainable strengths are similar, binder (30) develops strength at a faster rate than binder (29). The development of an as-gassed strength of 100 p.s.i. requires a time of 24 seconds for binder (29), but only 19 seconds for binder (30).

EXAMPLE 15

The following binder composition was prepared:
(31) 5 parts by weight of sodium tellurite were dissolved in 100 parts by weight of the hydrogenated starch hydrolysate syrup used to prepare binder (8). 20 parts by weight of the resulting solution were blended with 80 parts by weight of the sodium silicate solution used to prepare binder (8). The viscosity of the resulting binder was adjusted to 750 c.p. by the addition of water.

Binder composition (31) was compared to binder (8) by the procedure described in Example 1.

The gassing temperature was 22° C.

Under the test conditions binder (8) required a gassing time of 31 seconds to achieve an as gassed strength of 100 p.s.i., while binder (31) required only 24 seconds, although the attainable strengths were comparable.

We claim:

1. A binder composition consisting essentially of an aqueous solution prepared by mixing in the absence of heating:
   an alkali metal silicate,
   a substantially water soluble carbohydrate selected from the group consisting of (1) glycans, (2) monosaccharides, (3) disaccharides and (4) stabilised carbohydrates having a reducing power which has been removed by hydrogenation, etherification, esterification, oxidation or by reaction with urea or urea derivative,
   an oxyanion which forms a water soluble complex with the carbohydrate selected from the group consisting of oxyanions of boron, tin, germanium, tellurium or arsenic, and water.

2. A binder composition according to claim 1, wherein the alkali metal silicate is sodium silicate.

3. A binder composition according to claim 1, wherein the alkali metal silicate is sodium silicate having an $SiO_2:Na_2O$ ratio of from 2.0:1 to 2.5:1.

4. A binder composition according to claim 1, wherein the oxyanion is present as an oxyanion salt in an amount up to 5% by weight of the composition.

5. A binder composition according to claim 1, wherein the monosaccharide is selected from the group consisting of glucose, mannose and fructose.

6. A binder composition according to claim 1, wherein the disaccharide is selected from the group consisting of sucrose, maltose and lactose.

7. A binder composition according to claim 1, wherein the stabilized carbohydrate is a starch hydrolysate.

8. A binder composition according to claim 1, wherein the stabilised carbohydrate is selected from the group consisting of hexitols and pentitols.

9. A binder composition according to claim 1, wherein the stabilised carbohydrate is a starch hydrolysate having a dextrose equivalent below 5.

10. A binder composition according to claim 1, wherein the oxyanion is provided by a compound selected from the group consisting of alkali metal borates, stannates, tellurites, germanates and arsenites.

11. A binder composition according to claim 1, wherein the oxyanion is provided by a compound selected from the group consisting of sodium metaborate, sodium tetraborate, sodium pentaborate, sodium stannate, sodium tellurite, sodium germanate and sodium arsenite.

12. A binder composition according to claim 1 obtained by mixing 26 to 45% by weight of alkali metal silicate, 3 to 27% by weight of carbohydrate and 0.5 to 2% by weight of oxyanion salt.

13. A method of making an article of bonded particulate material, which method comprises mixing together in the absence of heating, the particulate material, an alkali metal silicate, a substantially water soluble carbohydrate selected from the group consisting of (1) glycans, (2) monosaccharides, (3) disaccharides and (4) stabilised carbohydrates having a reducing power which has been removed by hydrogenation, etherification, esterification, oxidation or by reaction with urea or urea derivative, an oxyanion which forms a water soluble complex with the carbohydrate selected from the group consisting of oxyanions of boron, tin, germanium, tellurium or arsenic, and water, forming the mixture to the desired shape, and hardening the shaped mixture

* * * * *

UNITED STATES PATENT AND TRADEMARK OFFICE
CERTIFICATE OF CORRECTION

PATENT NO. : 4,194,918

DATED : March 25, 1980

INVENTOR(S) : Raymond D. GEORGE and John STEVENSON

It is certified that error appears in the above-identified patent and that said Letters Patent are hereby corrected as shown below:

In the heading of the patent, Item [73] should read:

--[73] Assignees: Foseco International Limited, Birmingham, United Kingdom; and

Co-Operatieve Verkoop-En Productievereniging Van Aardappelmeel En Derivaten "Avebe" G.A., Veendam, Holland--

Signed and Sealed this

Fifteenth Day of July 1980

[SEAL]

Attest:

SIDNEY A. DIAMOND

Attesting Officer

Commissioner of Patents and Trademarks